(12) United States Patent
Leah et al.

(10) Patent No.: US 12,188,127 B2
(45) Date of Patent: Jan. 7, 2025

(54) LAYER

(71) Applicant: Ceres Intellectual Property Company Limited, Horsham (GB)

(72) Inventors: Robert Leah, Horsham (GB); Mike Lankin, Horsham (GB)

(73) Assignee: CERES INTELLECTUAL PROPERTY COMPANY LIMITED, Horsham (GB)

(*) Notice: Subject to any disclaimer, the term of this patent is extended or adjusted under 35 U.S.C. 154(b) by 95 days.

(21) Appl. No.: 18/002,849

(22) PCT Filed: Jun. 24, 2021

(86) PCT No.: PCT/GB2021/051602
§ 371 (c)(1),
(2) Date: Dec. 21, 2022

(87) PCT Pub. No.: WO2021/260381
PCT Pub. Date: Dec. 30, 2021

(65) Prior Publication Data
US 2023/0287570 A1    Sep. 14, 2023

(30) Foreign Application Priority Data
Jun. 25, 2020    (GB) .................................... 2009687

(51) Int. Cl.
*C23C 18/12* (2006.01)
*C25B 13/07* (2021.01)
(Continued)

(52) U.S. Cl.
CPC ...... *C23C 18/1216* (2013.01); *C23C 18/1241* (2013.01); *C23C 18/1295* (2013.01);
(Continued)

(58) Field of Classification Search
CPC .......................... C23C 18/1216; H01M 8/1253
See application file for complete search history.

(56) References Cited

U.S. PATENT DOCUMENTS

2011/0143038 A1*    6/2011    Bone ...................... C04B 41/89
                                                                                427/380

FOREIGN PATENT DOCUMENTS

| JP | 08133739 A | 5/1996 |
|---|---|---|
| JP | 2012164672 A | 8/2012 |

(Continued)

OTHER PUBLICATIONS

Benitez-Rico et al., "Understanding the High Ionic Conductivity in Nanostructured Ytterbium Stabilized Zirconia Thin Films," 2015, Journal of Nanomaterials, ID 692648, pp. 1-7. (Year: 2015).*

(Continued)

*Primary Examiner* — Robert A Vetere
(74) *Attorney, Agent, or Firm* — Kolitch Romano Dascenzo Gates LLC

(57) ABSTRACT

A method of manufacturing a layer of crystalline ytterbium doped zirconia on a substrate is disclosed. The method includes depositing a solution including precursor metal salts of the ytterbium doped zirconia onto a surface of the substrate, wherein the surface is a metallic or a ceramic surface. The solution is dried to form a film of the precursor metal salts on the surface. The film of the precursor metal salts is heated to decompose it to form an ytterbium doped zirconia. The previous steps may optionally be repeated. The film(s) are fired in order to form the layer of crystalline ytterbium doped zirconia. The ytterbium doped zirconia has a formula:

$$([Yb_xM_{1-x}]_2O_3)_z(ZrO_2)_{1-z}$$

wherein M is a metallic dopant ion; z is in the range of 0.03 to 0.13; and x is in the range of 0.05 to 1.

19 Claims, 4 Drawing Sheets

(51) Int. Cl.
*H01M 8/12* (2016.01)
*H01M 8/1253* (2016.01)

(52) U.S. Cl.
CPC ........... *H01M 8/1253* (2013.01); *C25B 13/07* (2021.01); *H01M 2008/1293* (2013.01); *H01M 2300/0077* (2013.01)

(56) References Cited

FOREIGN PATENT DOCUMENTS

| JP | 2016111017 | A  | 6/2016  |
|----|------------|----|---------|
| WO | 200235628  | A1 | 5/2002  |
| WO | 2003075382 | A2 | 9/2003  |
| WO | 2004089848 | A1 | 10/2004 |
| WO | 2005078843 | A1 | 8/2005  |
| WO | 2006079800 | A1 | 8/2006  |
| WO | 2006106334 | A1 | 10/2006 |
| WO | 2007085863 | A1 | 8/2007  |
| WO | 2007110587 | A2 | 10/2007 |
| WO | 2008001119 | A2 | 1/2008  |
| WO | 2008003976 | A1 | 1/2008  |
| WO | 2008015461 | A1 | 2/2008  |
| WO | 2008053213 | A1 | 5/2008  |
| WO | 2008104760 | A1 | 9/2008  |
| WO | 2008132493 | A2 | 11/2008 |
| WO | 2009090419 | A2 | 7/2009  |

OTHER PUBLICATIONS

Korkmaz et al., "Synthesis and Characterization of YbSZ Film Electrolytes, " 2014, 7th International Ege Energy Symposium & Exhibition. (Year: 2014).*

International Search Report and Written Opinion of the International Searching Authority from the European Patent Office, in PCT/GB2021/051602 dated Jun. 24, 2021, which is an international application to which this application claims priority.

Akshmi, V. Vijaya, et al.; "Phase formation and ionic conductivity studies on ytterbia co-doped scandia stabilized zirconia ($0.9ZrO_2$—$0.09Sc_2O_3$—$0.01Yb_2O_3$) electrolyte for SOFCs"; Solid State Sciences, vol. 13, No. 8, May 21, 2011.

Korkmaz, Esra, et al.; "Synthesis and Characterizations of YbSZ Film Electrolytes"; 7th International EGE Energy Symposium & Exhibition, Jun. 18, 2014.

Benitez-Rico, A., et al.; "Understanding the High Ionic Conductivity in Nanostructured Ytterbium Stabilized Zirconia Thin Films"; Journal of Nanomaterials, vol. 2015, Article ID 692648, pp. 1-7.

* cited by examiner

LAYER

FIELD

The present disclosure relates to methods for the deposition of ceramic films on ceramic or metallic surfaces, particularly the deposition of sub-micron thickness ytterbium doped zirconia.

BACKGROUND

Fuel cells, fuel cell stack assemblies, fuel cell stack system assemblies and the like are well known in the prior art and relevant teachings include the likes of WO 02/35628, WO 03/075382, WO 2004/089848, WO 2005/078843, WO 2006/079800, WO 2006/106334, WO 2007/085863, WO 2007/110587, WO 2008/001119, WO 2008/003976, WO 2008/015461, WO 2008/053213, WO 2008/104760, WO 2008/132493, WO 2009/090419 all of which are incorporated herein by reference in their entirety. A fuel cell may be used in a reverse mode as an electrolyzer cell. Thus, references hereinafter to cathodes and anodes (used for brevity and due to the more widespread fuel cell application), should in fact be construed as references to air (or oxidant) electrode and fuel electrode, respectively, which terms apply to a cell regardless of whether it is operating in a fuel cell or electrolyzer cell mode.

There has been a drive over a number of years to lower the operating temperature of SOCs from the traditional 800° C. to 1000° C., down to 600° C. or below. It has been recognized that achieving this requires the use of a different set of materials from those traditionally used for SOCs. In particular, this entails the use of cathode materials with increased catalytic activity and electrolyte materials with higher oxygen ion conductivity than the traditional yttrium stabilized zirconia (YSZ) when operating between 450° C. to 650° C.

The higher-performance cathode materials are typically perovskite oxides based on cobalt oxide, such as LSCF (lanthanum strontium cobalt ferrite), LSC (lanthanum strontium cobaltite) and SSC (samarium strontium cobaltite). The more conductive electrolyte materials are typically either (i) rare-earth-doped ceria such as SDC (samarium-doped ceria) and GDC (gadolinium-doped ceria), or (ii) materials based on lanthanum gallate, such as LSGM (lanthanum-strontium-magnesium gallate).

The conductivity of zirconia can also be significantly improved by doping with scandia rather than yttria, although this is a more costly material.

Unfortunately, materials with higher performance at lower temperatures are frequently less stable than the traditional high-temperature materials. Particular problems frequently encountered are:

High performance cathode materials react with zirconia to form strontium or lanthanum zirconate, which is a very poor ionic conductor, leading to performance degradation.

LSGM reacts with nickel oxide which is normally found in the anode.

Doped ceria can be partially reduced when exposed to a fuel atmosphere, developing mixed ionic/electronic conductivity. This in turn causes the cell to develop an internal short-circuit, reducing operating efficiency.

Doped ceria and zirconia can react if processed at temperatures in excess of 1200° C. producing a poorly conductive mixed phase.

To mitigate these undesirable material interactions, it is frequently desirable to have a composite electrolyte in which the electrolyte consists of a main layer and one or more interlayers. The main layer performs the primary functions of conducting oxygen ions between the cathode and the anode, and providing a gas-tight barrier to physically separate the reactants. The interlayer(s) are thin film(s) of another electrolyte material which separate the main electrolyte layer from one or both electrodes, preventing detrimental interactions. Typical uses of interlayers include:

An interlayer of doped ceria deposited between a zirconia main electrolyte layer and a cobaltite cathode to avoid the formation of zirconates and to improve the catalytic activity of the cathode.

An interlayer of doped ceria deposited between an LSGM main electrolyte and an anode to avoid reaction with nickel oxide found in the anode.

An interlayer of doped zirconia between a CGO electrolyte and electrode to prevent electronic conductivity.

It is known that production of a thin (less than 1 μm), even, continuous impermeable film is not a straightforward process for cost effective fuel cell production. Material quality, reproducibility and process costs mean that traditional powder routes, sintering routes and plasma or vacuum spray deposition routes are not attractive for high-volume manufacture. Also, for metal supported SOC's for example where the substrate is a ferritic stainless steel foil (e.g. perforated foil substrate) coated with active electrochemical layers, the substrate material places limitations on acceptable manufacturing processes.

WO 2009/090419 discloses a process for manufacturing thin films of scandium stabilized zirconia (ScSZ) for use in SOCs. However, whilst the electronic and structural properties achieved by this system are excellent, it is desirable to achieve at least comparable results using more readily available and less expensive materials.

Korkmaz, et al.; "*Synthesis and Characterizations of YbSZ Film Electrolytes*"; 7th INTERNATIONAL EGE ENERGY SYMPOSIUM & EXHIBITION; 18 Jun. 2014, discloses a sol-gel Pechini method in which a ytterbium doped zirconia film is formed and sintered at high temperature (1400° C.).

Benitez-Rico, et al.; "*Understanding the High Ionic Conductivity in Nanostructured Ytterbium Stabilized Zirconia Thin Films*"; JOURNAL OF NANOMATERIALS; Volume 2015; Article ID 692648; pages 1 to 7, discloses a pyrolysis technique for the manufacture of thin films of ytterbium doped zirconia for use as an electrolyte in a solid oxide fuel cell.

The present disclosure is intended to overcome, or at least ameliorate, one or more of the above issues.

SUMMARY

The present disclosure is particularly useful in the manufacture of high and intermediate temperature operating electrochemical cells including solid oxide cells (SOCs) and in particular metal supported intermediate temperature SOC operating in the 450° C. to 650° C. range. There is provided, in a first aspect of the present disclosure, a method of manufacturing a layer for a solid oxide cell, the layer comprising a crystalline ytterbium doped zirconia, wherein the method comprises the steps of: (i) depositing a solution comprising precursor metal salts of the ytterbium doped zirconia onto a surface of a substrate, wherein the surface is a metallic or a ceramic surface; (ii) drying the solution to form a layer of the precursor metal salts on the surface; (iii)

heating the layer of the precursor metal salts to form an ytterbium doped zirconia; (iv) optionally repeating steps (i) to (iii); and (v) firing said layer in order to form the crystalline ytterbium doped zirconia.

The inventors have found that doping zirconia with ytterbium results in a layer with comparable performance to those described in WO 2009/090419 without the reliance on more expensive dopant elements, such as scandium. Further, it has surprisingly been found that the presence of ytterbium in the deposition solution allows a greater concentration of zirconium to be dissolved in the deposition solution. This in turn means that the rate of deposition of precursor salts onto the substrate can be increased, as the same volume of solution will convey more zirconium salt to the substrate. This is especially valuable for mass manufacture as it reduces the number of deposition steps required to achieve a certain thickness of ytterbium doped zirconia, resulting in substantial cost savings. In addition, when ytterbium is used as a dopant, the uniformity of shape achieved from deposited films is improved. This means that fewer deposition cycles, and fewer films, are needed in order to achieve a layer having the same flatness and uniformity of shape (for example, as compared with those layers produced using 10Sc1YSZ in WO2009/090419). This in turn improves the speed and cost of manufacture.

Without being bound by theory, it is hypothesized that these properties may be due to the lower pH created from the more heavily polarized $Yb^{3+}$ ion, which is much heavier than $Sc^{3+}$. It is known that ions in the lanthanide series, particularly the heavier ones may particularly strongly interact with solvents due to electrostatic effects from the highly positively charged nucleus which is poorly shielded by the 4f electrons.

The ytterbium doped zirconia may also be referred to as a ytterbium stabilized zirconia (YbSZ) as would be familiar to one skilled in the art. The crystalline ytterbium doped zirconia will usually have a cubic crystal structure.

The substrate may comprise a dense solid oxide electrolyte for a solid oxide cell, onto which substrate the layer of crystalline ytterbium doped zirconia is formed.

The term "solid oxide cell" is intended to encompass both solid oxide fuel cells (SOFCs) and solid oxide electrolysis cells (SOECs). Typically, the present disclosure is implemented with respect to SOFCs.

Typically, the "layer" of ytterbium doped zirconia refers to an entire functional sheet of material. For instance, the anode, electrolyte and the cathode are each considered a separate layer of the SOC, though each of these layers may possess a structure comprising a plurality of deposited films of material. Typically, said layer is an interlayer. The interlayer is typically applied to the electrolyte and most typically is positioned between the electrolyte and the cathode (or air electrode). The position of the interlayer is not necessarily directly adjacent to the cathode and in some embodiments a barrier layer is positioned between the interlayer and the cathode. In some embodiments, this barrier may be a thin film of electrolyte. The layer may comprise a crystalline ytterbium doped zirconia with a single phase, cubic crystal structure.

The term "film" as used herein refers to a single plane of material arising from a single deposition step. Multiple films may be deposited through the repetition of steps (i) to (iii) and through the repetition of steps (i) to (v) in order to create a laminar (or stacked) structure, which, taken together form the "layer" (see above).

The ytterbium doped zirconia layer formed in heating step (iii) of the present disclosure will usually be an "amorphous" layer. Such a layer need not be completely amorphous. The purpose of the heating step (iii) is, among other things, to convert (or decompose) the precursor salts deposited onto the surface of the substrate into a metal oxide of ytterbium and zirconia i.e. a ytterbium doped zirconia. Typically, the heating step is configured such that substantially all of the precursor salts are converted. As such, it may be the case that some of the ytterbium doped zirconia becomes crystalline during step (iii) prior to firing step (v). In step (v), substantially all of the amorphous ytterbium doped zirconia is converted into a crystalline ytterbium doped zirconia.

By "solution" is meant a true solution comprised of at least one substance (the solute) in at least one other substance (the solvent), i.e. excludes the presence of solid particles and thus excludes liquid colloidal dispersion, colloidal solutions, and mechanical suspensions.

For the avoidance of doubt, reference to "room temperature" (or "RT") herein is intended to refer to a value in the range of 10° C. to 40° C., more typically 20° C. to 30° C.

Experiments undertaken by the inventors have shown that the presence of solids in the film of step (i) generate stress points which result in cracking and therefore loss of layer integrity. Thus, the inventors have found that it is desirable to have a thin layer deposition process that dries and anneals in a homogenous way. Depositing a homogeneous layer allows for homogeneous drying and annealing with low risk of cracking. A layer made from a sol-gel mix or suspension containing solid particles will tend to dry in an uneven way and will also sinter in a non-homogeneous way, with the suspension areas drying faster than those around the particle or gel, creating mechanical drying and annealing stresses which can lead to cracking. Therefore, to create a layer of sufficient thickness, it is often necessary to deposit several films.

Typically, the temperature of the firing step (v) is in the range of 500° C. to 1100° C., more typically 700° C. to 1000° C. and more typically no greater than 1000° C. The layer formed by the process of the present disclosure is typically for use in metal supported SOCs, wherein the metal support is typically fabricated from steel. At process temperatures above 1100° C., more rapid oxidation of this steel occurs and a migration of volatile metal species can also occur. This is especially true for stainless steels, such as ferritic stainless steel, where chromium migrates into other parts of the cell (e.g. the cathode, the electrolyte or the anode). This is known to lead to a loss of performance of the cell.

The present disclosure is particularly applicable to metal supported intermediate temperature (e.g. typically operating below 650° C.) electrochemical cells, such as, for example, the fuel cell designs disclosed in GB2368450 and GB2434691. More particularly, the present disclosure is useful in the manufacture of an interlayer comprising crystalline ytterbium doped zirconia, deposited in conjunction with a doped ceria electrolyte of a fuel cell. The crystalline ytterbium doped zirconia electronically insulates fuel cell electrodes from one another and thus prevents internal short-circuiting.

Typically, the surface of the substrate onto which the ytterbium doped zirconia precursor salts are deposited is generally flat or continuously smooth. Often, the surface of the substrate is generally impermeable, i.e. is non-porous and impermeable to liquids, in particular, to the solution of precursor metal salts. Usually, the substrate is capable of withstanding rapid thermal cycling.

Thus, the method of the present disclosure is particularly well suited to the fabrication of interlayers of crystalline ytterbium doped zirconia as part of SOCs, more typically low- or intermediate-temperature SOCs. In particular, the method of the present disclosure is well suited to the creation of layers of crystalline ytterbium doped zirconia as part of metal-supported SOCs, more typically low- or intermediate-temperature metal-supported SOCs, wherein the inherent robustness of the metal support (often a foil made from stainless steel such as a ferritic stainless steel, and more typically a foil with a perforated region surrounded by a non-perforated region) allows rapid thermal cycling, whilst imposing limits upon the maximum process temperature.

Thus, the substrate is usually an electrolyte layer, more typically an electrolyte layer made from a mixed ionic electronic conducting electrolyte material, even more typically a CGO electrolyte layer.

Often, the layer of crystalline ytterbium doped zirconia is a dense layer. Typically, the layer of crystalline ytterbium doped zirconia is at least 90% dense (i.e. at least 90% of its theoretical density). In some cases, it is at least 91%, 92%, or 93% dense. Most usually it is at least 93% dense. As will be appreciate by one skilled the art, it is difficult to achieve 100% theoretical density. As such, typically the crystalline ytterbium doped zirconia is in the range of 90% dense to 99.5% dense, more typically 91% to 99% dense and more typically still 92% to 98% dense. The layer of crystalline ytterbium doped zirconia is typically gas-impermeable. This is of particular relevance to the use of the present disclosure in the manufacture of fuel cell electrolytes where it is desirable for an interlayer to be ion-permeable, electrically insulating, and gas-impermeable to prevent internal short-circuiting.

It is desirable that the solution of salt precursors, when deposited onto the surface, spreads and dries as a continuous, even film. Typically, the solution of soluble salt precursors of the ytterbium doped zirconia is deposited onto the surface by a method selected from the group consisting of: spraying, dipping, jetting (such as inkjet printing) and spin-coating. Examples of spraying techniques are air- and gas-assisted spraying.

Typically, the soluble salt precursor is dissolved in a low surface-tension solvent. Typical solvents include methanol, ethanol, propanol, methoxypropanol (also known as MEP, 1-methoxy-2-propanol, PGME, I-methoxypropan-2-ol, propylene glycol methyl ether), ethyl acetate, acetone, butyl carbitol or any mixtures thereof. Of these: ethanol, methanol, ethyl acetate, methoxypropanol, and mixtures thereof are typically used. In some cases, a mixture of ethanol and methoxypropanol, or ethyl acetate and methoxypropanol, will be used. Usually, ethanol or ethyl acetate is used as the primary solvent. In some embodiments, ethyl acetate is used as the solvent. Typically, the ratio of ethanol (or ethyl acetate) to methoxypropanol will be in the range of 95%:5% to 50%:50%, more typically 95%:5% to 85%:15%, and most typically about 90%:10%. When choosing solvents for the soluble salt precursor, factors to be taken into account include the solubility of the precursor in the solvent, drying rate and how readily the soluble salt precursor layer on the surface will even out due to surface tension effects. Suitable solvents will be readily apparent to one of ordinary skill in the art.

Typically, the solution has a pH in the range 2 to 6, more typically 2 to 5, even more typically 2 to 4 and most typically 3 to 4. In some situations, the pH is in the range of 2 to 3. Typically, the solution further comprises an acid, typically a mild acid. The acid may be selected from: acetic acid, citric acid, nitric acid, or a combination thereof. Surprisingly, the applicant has discovered that the optional use of acids enhances the stability of the solution, improving its longevity and/or allowing more concentrated solutions to be used, the latter permitting the deposition of more material in one pass with a consequential reduction in the number of deposition passes needed. A mild acid, e.g. acetic acid, is typically used in an amount of up to 3 vol % based on the total volume of the solution, more preferably up to 2% or 1%, with an amount of 0.25% to 0.9% being ideal. For example, higher acetic acid concentrations (e.g. between 2 vol % to 3 vol %) work but may detrimentally affect the drying characteristics of the layer.

As is detailed above, the soluble salt precursors need to decompose when heated to leave, as much as possible, only the (amorphous) ytterbium doped zirconia. Suitable salts include but are not limited to nitrates and metal-organic salts. Metal-organic salts are often used since they typically form a good film. Of these salts, an acetylacetonate is typically employed. Binders may be included in the solution where desired.

As will be noted, the precursor salts of the ytterbium doped zirconia film do not need to be formed exclusively from ytterbium and zirconium salts. Additional soluble salt precursors can be added with a view to forming a mixed crystalline ytterbium doped zirconia. Typically, the crystalline ytterbium doped zirconia has a formula:

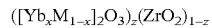

$$([Yb_xM_{1-x}]_2O_3)_z(ZrO_2)_{1-z}$$

wherein M is a metallic dopant ion; z is in the range of 0.03 to 0.13; and x is in the range of 0.05 to 1. Usually, x is in the range of 0.5 to 1.

M may be a trivalent metallic ion. M may be selected from any one or more of the following: from the group of lanthanide elements excluding ytterbium and promethium. Typically, the lanthanide element is selected from: La, Ce, Pr, Nd, Sm, Eu, Gd, Tb, Dy, Ho, Er, Tm and Lu. Often, the lanthanide element is Ce, Sm, Er and Lu. Alternatively, M may be a transition metal selected from Sc, Y and Al, most typically Sc or Y.

Often, z is in the range 0.03 to 0.13, more typically 0.06 to 0.12, and even more typically 0.07 to 0.10. Where x=1, such that there is no dopant M, YbSZ is stabilized in the cubic form in the range 6 mol %-12 mol % $Yb_2O_3$ (i.e. mol % with respect to the oxide), and hence, z is in the range 0.06 to 0.12. This assists the crystalline ytterbium doped zirconia to adopt the desired (single phase) cubic crystal structure. Where z is in the range 0.07 to 0.10, even better conductivity is seen, with maximum conductivity seen where z is about 0.08. Thus, 8 mol % ytterbium-stabilized zirconia (8YbSZ, $(ZrO_2)_{0.92}(Yb_2O_3)_{0.08}$) is optimal. However, z may be as low as 0.03, and in the case of 3 mol %-5 mol % $Yb_2O_3$, the crystalline ytterbium doped zirconia adopts a tetragonal/cubic phase which, although lower in conductivity, is mechanically stronger.

Typically, the deposition technique used in step (i) is jetting or spraying. In particular, jetting may be ink jetting. Spraying may be by atomized spraying, more usually air atomized spraying. Spraying often occurs using a sonic atomizer or an ultrasonic atomizer. Typically, deposition step (i) occurs in a single spraying or jetting pass. Typically, deposition step (i) is undertaken at a temperature in the range 10° C. to 100° C., more typically 15° C. to 50° C., more typically at room temperature. Typically, the temperature is the surface temperature of the substrate, i.e. deposition step (i) is undertaken with the surface of the substrate (or metal oxide film as appropriate) having a temperature in the range 10° C. to 100° C., more typically 15° C. to 50° C., more typically at room temperature.

Deposition may be undertaken using a jetting head. Ideally, liquid is deposited as discrete droplets of fixed volume, with the frequency of deposition and speed of the X-Y stage being tuned such that the liquid droplets cover the whole surface of the part without overlapping. The droplets then spread out and merge together on the part after deposition to form a uniform liquid film, with the total volume calibrated to achieve a predetermined film thickness once dry. It is typically not necessary to heat the substrate, a substrate temperature in the range 15° C. to 50° C. being sufficient to achieve a coherent, even film.

Typically, the film of soluble salt precursors deposited onto the substrate surface is allowed to even out to a homogeneous thickness prior to drying step (ii). Thus, the method may additionally comprise prior to step (ii) the step of allowing said solution deposited onto said surface to stand for a period of at least 5, 10, 15, 20, 25, 30, 35, 40, 45, 50, 55 or 60 seconds. The solution is usually left to stand no longer than 5 minutes. This post-deposition dwell time typically occurs in air at standard atmospheric conditions at room temperature, more typically at a temperature in the range 15° C. to 50° C. During this dwell time, the film typically starts to dry.

The drying step is important since incorrect drying conditions can result in an uneven thickness of the film of soluble salt precursor (after a drying step) and hence an uneven layer of ytterbium doped zirconia. The more uneven that the film of soluble salt precursor is after drying, the more likely it is to crack, particularly where it is thickest.

The inventors have found that controlling the temperature during deposition step (i), particularly during repeat deposition steps, can improve the quality of the layer. Deposition of a film of the solution of the soluble ytterbium doped zirconia salt precursors immediately after completion of heating step (iii), with the surface temperature of the substrate (or metal oxide film) above 100° C., results in rapid drying of the solution and the formation of a soluble salt precursor layer having an uneven thickness. This in turn results in an increased propensity to cracking and mechanical defects in the resulting ytterbium doped zirconia layer, reducing the product lifespan.

Typically, at least 90% of the solvent in the deposited solution of the soluble salt precursor is removed by the end of drying step (ii), more typically at least 95% of the solvent and most typically >95% of the solvent. Typical conditions for the drying step (ii) are a temperature in the range 15° C. to 50° C., more typically room temperature.

In certain conditions (for example when certain types of solvent are being used or in certain atmospheric conditions), additional heating may be required during the drying step (ii) in order to achieve >90% solvent evaporation. For example, during the drying step the solution of the soluble salt precursor may be heated to about 100° C. for a period sufficient to achieve >90% solvent evaporation. The drying step removes sufficient solvent (typically >90%) to create a stable, coherent, even film for further processing.

The step of heating the soluble salt precursors on the substrate to decompose it and form a mostly amorphous ytterbium doped zirconia layer typically involves heating the soluble salt precursor to a temperature in the range 200° C. to 600° C., usually above 300° C., and more typically up to about 550° C. The degree of crystallinity that is produced in heating step (iii) is typically equal to or less than 50%, more typically equal to or less than 40%, even more typically equal to or less than 30%, and most typically equal to or less than 20%.

The step of heating the soluble salt precursors on the surface to in the range 200° C. to 600° C. may result in crystallization starting to occur. Thus, the ytterbium doped zirconia layer may therefore be considered to be semi-crystalline. However, crystallization is incomplete at the end of heating step (iii) and firing step (v) is still required to achieve more complete crystallization.

Typically, the heating is achieved by the use of a rapid heating heat source, such as an infra-red heat source. This can allow the heating to be evenly and conveniently achieved in less than five minutes, typically less than four, three, two or one minute. More typically, heating step (iii) occurs for less than 60 seconds and often equal to or longer than 5 seconds. This rapid heating allows for rapid throughput of cells during manufacture processing.

The maximum film thickness which can be achieved per cycle of deposition, drying and heating is dependent upon the avoidance of cracking either during the drying step (ii) or the heating step (iii).

Typically, each film of amorphous ytterbium doped zirconia has a thickness in the range 10 nm to 999 nm, more typically 25 nm to 250 nm, more typically 50 nm to 200 nm, more typically 75 nm to 150 nm, more typically 100 nm to 150 nm. Typically step (iv) is performed at least once, but often 10 times or fewer, more typically 8 times or fewer, more typically still 6 times or fewer, even more typically 4 times or fewer, even more typically still 3 times or fewer. Most typically, step (iv) is performed 2 times or fewer i.e. in order to create a layer composed of two or three films, most typically three films.

Steps (i) to (iii) may be repeated to define a plurality of films of amorphous ytterbium doped zirconia precursor on the surface of the substrate. Typically, subsequent to the heating step (iii) and prior to the repeat of deposition step (i), the substrate and amorphous ytterbium doped zirconia film is cooled to below the decomposition temperature used in heating step (iii), more typically to <100° C. and more typically still to <50° C., and usually room temperature. In a high volume manufacturing plant, rapid cooling can be achieved by placing the coated substrate (for example a metal foil) onto a cool surface, such as a water cooled metal plate, where the rapid transfer of heat can occur from the relatively low thermal mass substrate to the relatively large, cooler, thermal mass of the metal cooling plate. Other cooling mechanisms will be apparent to one skilled in the art. In a simple process it is possible for the cells to cool in air prior to the next processing stage.

Different soluble salt precursors can be used at each repeat of steps (i) to (iii), thus resulting in the production of a plurality of films, creating a laminar structure within the ytterbium doped zirconia layer, wherein at least one of the films comprises the ytterbium doped zirconia. Thus, for example, soluble salt precursors selected from the group consisting of: zirconium acetylacetonate and ytterbium nitrate pentahydrate can be used in steps (i) to (iii) and in a repeat of steps (i) to (iii) soluble salt precursors can be selected from the group consisting of: cerium acetylacetonate and gadolinium nitrate. Thus, the crystalline ytterbium doped zirconia layer produced at step (v) may be laminar, comprising a first crystalline ceramic ytterbium doped zirconia film and a second crystalline ceramic CGO film.

Both drying step (ii) and heating step (iii) lead to significant shrinkage of the layer of soluble salt precursors. If the layer is sufficiently thin, the shrinkage stresses that build up as a result of drying and/or heating do not result in cracking or mechanical failure and a dense, defect-free ytterbium doped zirconia layer is formed. However, if the layer is too thick then the shrinkage stresses can lead to cracking or even delamination and thus failure of the resulting layer.

Further shrinkage occurs on crystallization, i.e. during firing step (v), and so the maximum thickness of the crystalline ytterbium doped zirconia in the present disclosure is partially defined by what is achievable without cracking on crystallization. The ytterbium doped zirconia layer thickness is also determined by the number of successive deposition steps and heating steps performed before crystallization, and the thickness of each of these films is limited as described above.

The actual maximum allowable ytterbium doped zirconia layer thickness before crystallization will be determined by factors such as the material being deposited and its degree of shrinkage on crystallization, the level of residual material (such as carbon) left behind from the heating process, and the evenness of the deposited layer.

Typically, after the completion of one set of steps (i) to (v), that is to say with a single firing step (v), then the resulting crystalline ytterbium doped zirconia layer optionally formed by multiple deposition passes (i) to (iii), has a thickness in the range 100 nm to 999 nm, more typically 200 nm to 800 nm, even more typically 250 nm to 700 nm, and most typically 400 nm to 600 nm.

Typically, after firing step (v) the crystalline ytterbium doped zirconia layer is substantially fully crystallized, more typically fully crystallized, into a layer of ytterbium doped zirconia crystalline ceramic (bonded to the substrate). Typically, the layer of ytterbium doped zirconia crystalline ceramic is impermeable. Typically, the layer of ytterbium doped zirconia crystalline ceramic is generally continuous, i.e. is not cracked, porous, perforated, permeable or otherwise mechanically broken.

If it is desired to provide a thicker layer of ytterbium doped zirconia crystalline ceramic then it is possible to repeat steps (i) to (v) (i.e. undertake another set of steps (i) to (v) culminating in a further firing step), this time the surface used for the deposition is the layer of crystalline ytterbium doped zirconia previously produced (by first set). However, it is typically desirable to avoid additional sintering steps in order to avoid unnecessary metal ion species migration from the substrate (typically stainless steel) into the fuel cell electrolyte and/or electrodes and also to avoid unnecessary oxide layer growth on the substrate. Often, where steps (i) to (v) are repeated fewer times, they are repeated three times or fewer, more typically two times or fewer, and most typically one time.

Thus, the method can additionally comprise the step of: (vi) repeating at least once steps (i) to (v) (in which step (iv) is optional), the surface being the layer of ytterbium doped zirconia crystalline ceramic previously produced in step (v). It is thus possible to have an intermediate crystallization and then deposit further films on top of the crystallized ytterbium doped zirconia layer to further increase the overall layer thickness.

When utilizing step (v), each repeat of steps (i) to (v) does not need to be performed using the same conditions as the previous repeat. Thus, different solutions of a different soluble salt precursor of the same or different metal oxide crystalline ceramics may be used. Indeed, subsequent layers of material need not also comprise a crystalline ytterbium doped zirconia. Step (iii) may or may not be incorporated in the repeat and, if incorporated, steps (i) and (ii) may be repeated a different number of times.

As such, it is typically the case that the layer of crystalline ytterbium doped zirconia has a total thickness, after steps (i) to (v) including any repeats of step (v) have been completed, in the range 100 nm to 2.0 µm, more typically in the range 400 nm to 1.5 µm, even more typically in the range 800 nm to 1.4 µm, and most typically in the range 0.9 µm to 1.2 µm.

Thus, as well as producing a series of films, wherein at least one of said films comprises a ytterbium doped zirconia crystalline ceramic, by repeating steps (i) to (v) a desired number of times (the product of which can be treated as a layer of a single material), it is also possible to produce a plurality of discrete films of metal oxide crystalline ceramic on a surface, one on top of the other. Each film of metal oxide crystalline ceramic being the same or different to the previously produced layer of metal oxide crystalline ceramic, with the proviso that at least one of said layers comprises a crystalline ytterbium doped zirconia.

For example (and as detailed above), within a SOC anode-electrolyte-cathode layer structure, it can be highly desirable to provide an electrically insulating, ion conducting layer within a mixed ionic electronic conducting electrolyte layer. Thus, an interlayer in the form of a gas-impermeable, ion-permeable, electrically insulating, layer of ytterbium doped zirconia crystalline ceramic can be deposited on top of a CGO main layer (a layer of metal oxide crystalline ceramic). Typically, an additional comparatively thinner CGO layer is deposited on top of the interlayer, i.e. between the interlayer and the cathode.

Thus, the method of the present disclosure may comprise step (v) as detailed above, wherein: in the first set of steps (i) to (v) the soluble salt precursor is selected from at least one of the group consisting of: zirconium acetylacetonate, and ytterbium nitrate pentahydrate; and in the second set of steps (i) to (v) the soluble salt precursor is selected from at least one of the group consisting of: cerium acetylacetonate and gadolinium nitrate.

The method of the present disclosure can be used in the manufacture of a solid oxide cell having the layer structure anode-electrolyte-cathode, wherein one or more interlayers are provided. Typically, at least one interlayer is positioned adjacent to the electrolyte in order to insulate the electrolyte from the electrodes. In some embodiments, an interlayer is disposed between the electrolyte and both electrodes, but most typically a single interlayer is positioned between the electrolyte and the cathode. As explained above, the interlayer is not necessarily positioned directly adjacent the cathode. A barrier layer may be provided to prevent direct contact between the interlayer and the cathode, this is typically made from the same material as the electrolyte.

In other embodiments, the layer of ytterbium doped zirconia crystalline ceramic thickness may be graded across the surface. This grading of the thickness of the layer of ytterbium doped zirconia crystalline ceramic can, for example, be achieved using different-sized spraying masks on successive deposition steps (i.e. when repeating steps (i) to (iii) discussed above) so that the number of films deposited is varied in different areas of the cell. Alternatively, the grading can be achieved by angling the substrate with respect to the spray direction or by fine control of the spray pattern. Fine control can be readily achieved by the use of ink-jet printing techniques or multi-spray heads.

As well as relating to the deposition of layers of ytterbium doped zirconia crystalline ceramic onto planar surfaces such as planar fuel cell surfaces, the present disclosure is also applicable to deposition upon non-planar surfaces. For instance, the method of the present disclosure can be used in the deposition of layers of ytterbium doped zirconia crystalline ceramic for roll or tube form SOCs, where the soluble salt precursor solution is deposited by e.g. spraying onto a rotating tube. In other embodiments, a tube can be dipped into a soluble salt precursor solution to cover either one surface of the tube or both surfaces of the tube. Thickness control can be achieved not only by controlling the viscosity characteristics of the solution, but also by rotating the tube during and after dipping. Gradation control on a tubular fuel cell can be controlled by varying the depth of dipping on subsequent dips after the previous layer has dried on the tube. Dipping can also be used for planar fuel cells, where masking is used to protect areas of the cell where the coating is not required or is undesirable.

For circular surfaces such as the surfaces of circular fuel cells, a spray pattern can be used which is suitable for coating a disc. In order to achieve the correct layer of metal oxide crystalline ceramic thickness, the above methodology of deposition, decomposition and crystallization can be used. Indeed, grading can occur across a surface such as a tubular, cylindrical or circular surface as for a planar surface.

Thus, the method of the present disclosure provides for the simple and convenient deposition of films of ytterbium doped zirconia crystalline ceramic, particularly sub-micron layers, without the requirement for high processing temperatures, conventional sintering operations or expensive high-vacuum techniques such as PVD (physical vapor deposition).

It is thus particularly well suited to the deposition of interlayers on low- or intermediate-temperature metal supported SOCs where conventional sintering is made more difficult by the sintering temperature in air or an air containing environment being constrained by the substrate, and where processing temperatures cannot exceed 1100° C.

Experiments have shown that the method of the present disclosure is advantageous for forming excellent interfaces between various components, as the liquid precursor solution exactly follows the surface topography. This is difficult to achieve by conventional sintering of dissimilar materials, particularly if the substrate has already been sintered before deposition of the layer above, thus constraining the sintering of the upper layer. Particularly where the interface in question is within an SOC electrolyte, a poor interface will lead to high ionic resistance as well as being a mechanical weak point and thus resulting in increased product failure and shorter average working life.

There is provided in a second aspect of the present disclosure, a layer obtained by way of the method according to the first aspect of the present disclosure. The inventors have found that SOCs employing a layer obtain by way of the method of the first aspect of the present disclosure perform better than comparable prior art systems or at least comparable to prior art systems which employ more complicated architectures or more expensive (and/or more exotic) materials.

In a further embodiment of the second aspect of the present disclosure, there is provided a layer for a solid oxide cell comprising a crystalline ytterbium doped zirconia, wherein the layer comprises 12 films or fewer. The inventors have found that using ytterbium doped zirconia allows layers of material to be created with comparable properties to the prior art but which possess a laminar structure (identifiable in the final structure) comprised of fewer individual films. This is extremely advantageous as it not only allows the layers to be manufactured more quickly, but with fewer films present in the laminar structure, there is a decreased risk of delamination occurring between films and/or other defects developing at the interface between adjacent films in the laminar structure.

It is typically the case that the layer comprises 10 films or fewer, more typically 8 films or fewer. Often, the layer comprises 6 films or fewer, though typically the number of films is in the range of 6 to 8, most typically 6.

As explained above in the first aspect of the present disclosure, not every film need comprise crystalline ytterbium doped zirconia. However, it is typically the case that all the films do comprise crystalline ytterbium doped zirconia.

There is provided in a third aspect of the present disclosure, a solid oxide cell, comprising the layer according to the second aspect of the present disclosure. Typically, the solid oxide cell is a solid oxide fuel cell. In a further embodiment, a plurality of said cells may be connected to form a fuel cell stack.

There is provided in a fourth aspect of the present disclosure, a solution for use in the manufacture of a layer of a SOC, the solution comprising metal ion salts selected from: a zirconium salt and a ytterbium salt; wherein the zirconium salt is zirconium acetylacetonate; and wherein the concentration of metal ions in the solution is 0.1M or greater.

As explained above in relation to the first aspect of the present disclosure, it has surprisingly been found that ytterbium enhances the solubility of zirconium precursor salts. This allows a solution of enhanced zirconia precursor salt concentration to be created, thereby increasing the rate at which zirconia can be loaded onto a target substrate.

Typically, a concentration of metal ions (i.e. the combined concentration of the zirconium, the ytterbium and any other metal ions) is in the range of 0.1M to 0.5M, more typically 0.1M to 0.2M.

Typically, the solution comprises a solvent as detailed above. For example, it may be selected from: methanol, ethanol, propanol, methoxypropanol, ethylacetate, acetone, butyl carbitol or combinations thereof. Of these, it is most common for the solvent to comprise ethanol and it is typically the case that a mixture of ethanol and methoxypropanol are used. Often, the solvent comprises in the range of 80% to 95% ethanol and 20% to 5% methoxypropanol; more typically about 90% ethanol:10% methoxypropanol.

There is also provided in a fifth aspect of the present disclosure, the use of the solution according to the fourth aspect of the present disclosure, in the manufacture of a SOC. More typically, the use relates to the manufacture of a layer of a SOC according to the second aspect of the present disclosure. Typically, the layer is part of a SOFC. Usually, the use relates to the manufacture of an interlayer.

In order to aid understanding, preferred embodiments of the present disclosure will now be described with respect to the following figures and examples.

EXAMPLES

Figure 1:
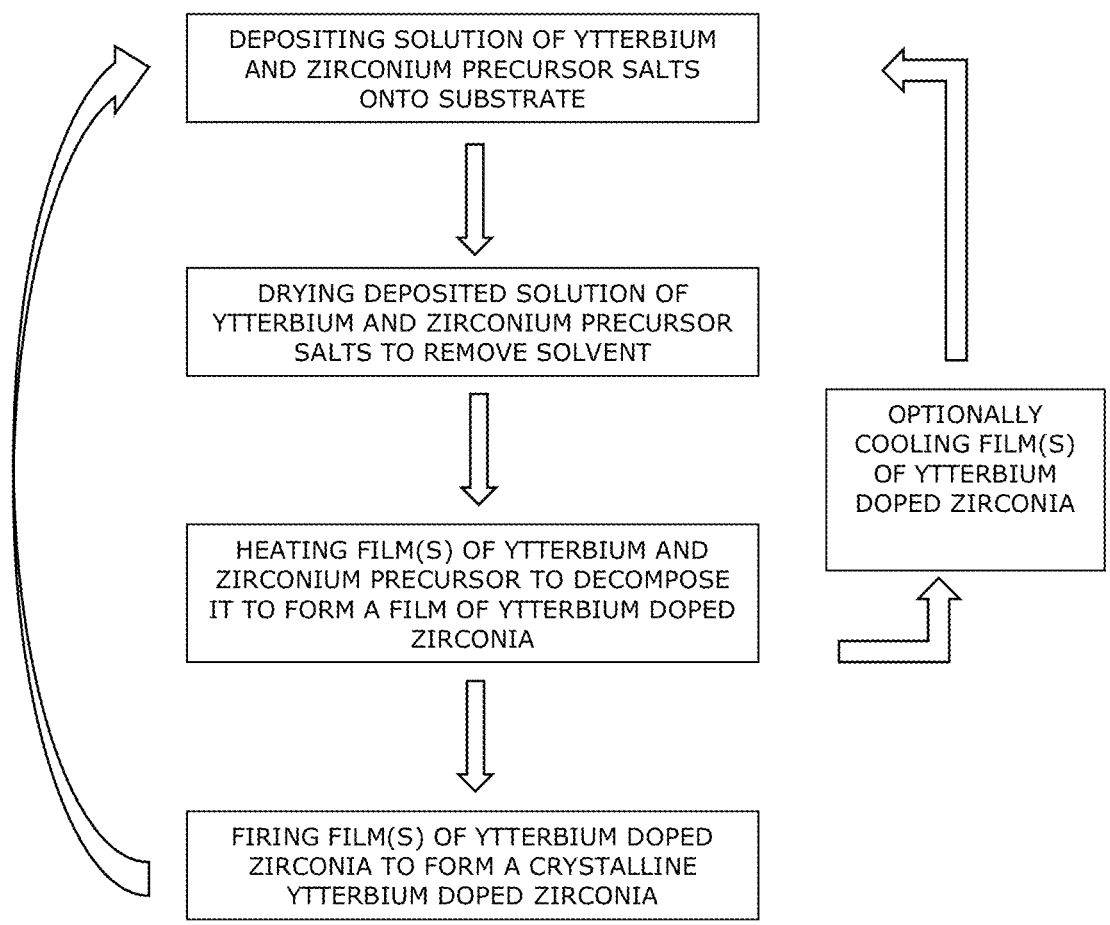
FIG. 1 shows a schematic representation of the process of the present disclosure.

Example 1—Preparation of Crystalline Ytterbium Doped Zirconia Layer

A solution was made by dissolving zirconium acetylacetonate and ytterbium(III) nitrate pentahydrate in a solvent mixture of 90 vol % ethanol and 10 vol % methoxypropanol to give a total molarity of metal ions of 0.14M, with the ratio of zirconium to ytterbium of 0.852:0.148. This gives a desired 8 mol % ytterbia in the finished material (crystalline ytterbium doped zirconia). The salts were dissolved at 50° C. and then the solution was allowed to cool to room temperature.

The solution was deposited onto a half cell of a solid oxide fuel cell of the kind described in WO 2016/124928 (paragraph [0052], FIG. 3 of that document) consisting of a ferritic stainless steel support and a layer of dense sintered CGO (cerium gadolinium oxide) electrolyte applied thereto.

The deposition was undertaken using a jetting head on an automated X-Y stage. The liquid was deposited as discrete droplets of fixed volume, with the frequency of deposition and speed of the X-Y stage being tuned such that the liquid droplets covered the whole surface of the part without overlapping. The droplets spread out and merge together on the part after deposition to form a uniform liquid film. The total volume of liquid deposited was calibrated such that the final film would be approximately 170 nm thick.

The resulting liquid film was allowed to dry in still air for 4 minutes, which was long enough for the solvents to evaporate leaving a uniform transparent film of precursor salts.

The part coated in a dried film of the ytterbium and zirconium precursor salts was placed on an infrared heater lamp and heated over a 3 minute cycle such that the temperature of the part reached a temperature in the range 400° C. to 600° C. in order to decompose the precursor salts to an amorphous oxide film, before being allowed to cool back to close to room temperature. These deposition, drying and heating steps were repeated a further two times to build up a layer thickness of approximately 500 nm by means of three passes.

The whole half cell was then placed in a furnace and heated from room temperature to 800° C. in air, increasing the temperature at a rate of 5° C. per minute, with a dwell of one hour, in order to crystallize the amorphous oxide film to a nanocrystalline film of 8YbSZ as desired.

The whole process (i.e. deposition, drying, heating and firing) described above was repeated one further time to produce a layer of 8YbSZ with a total thickness of approximately 1 μm (i.e. formed by six deposition steps in total).

A layer of doped ceria was then deposited onto the layer of 8YbSZ in the same manner as described in WO 2009/090419 (page 26, line 10 to 17 of that document).

An air electrode was screen printed onto the finished three-layer electrolyte consisting of perovskite oxides as known in the art.

Several additional cells were made using the same process, and built into a solid oxide fuel cell stack. The electrochemical performance of this stack was compared to the system of WO 2009/090419 which uses a 10Sc1YSZ interlayer.

The internal resistance of the cells was measured as a function of temperature using AC impedance spectroscopy. This allows the internal resistance of the cell to be split into its component parts. The ohmic (series) resistance of the cell includes the resistance to transport of oxygen ions through the zirconia layer. The ohmic resistance of the cells is exponentially temperature dependent, and plotting the natural log of ohmic resistance against reciprocal temperature produces a straight line (known as an Arrhenius plot).

Figure 2:
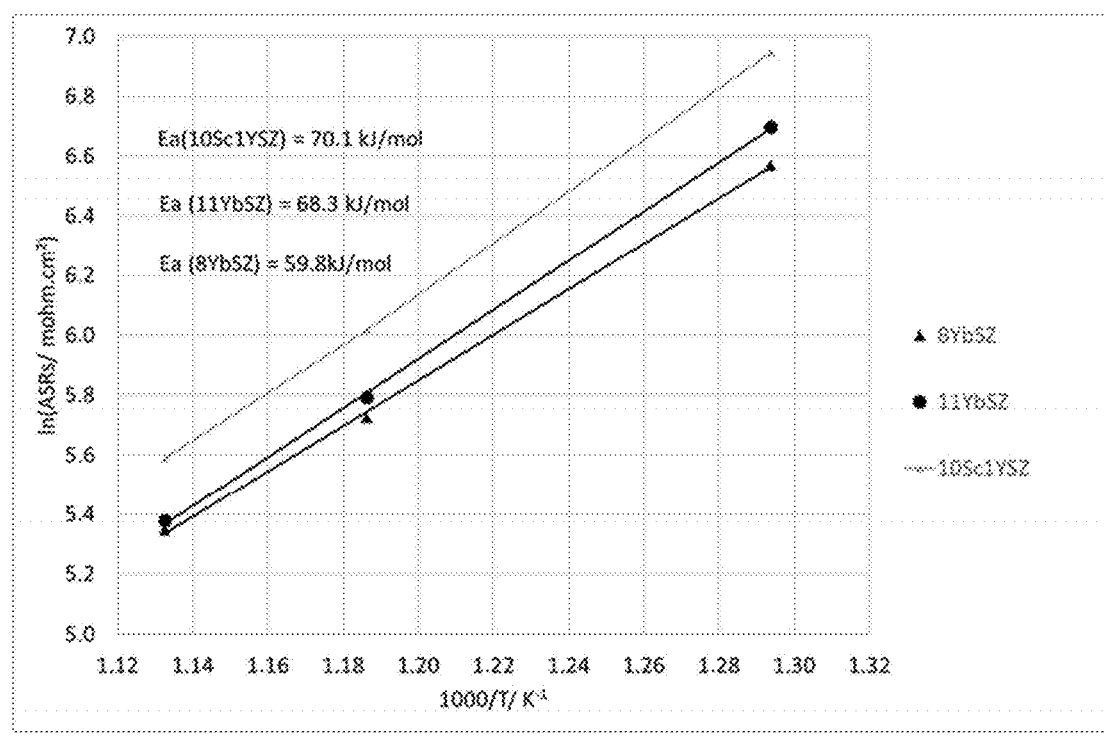
FIG. 2 shows a comparison of the ohmic resistance of solid oxide fuel cells using 8YbSZ interlayers, solid oxide fuel cells using 11YbSZ interlayers and solid oxide fuel cells using 10Sc1YSZ interlayers.

As shown in FIG. 2, the ohmic resistance of the cells of the present disclosure, using the 8YbSZ interlayer, is consistently lower than the 10Sc1YSZ interlayer equivalent in the temperature range at which low-temperature metal-supported SOCs operate. Specifically, the cells using an 8YbSZ interlayer have a lower ohmic resistance than the prior art cells using a 10Sc1YSZ interlayer across the temperature range 500° C. to 610° C. The gradient of the line (the activation energy) is lower in the case of 8YbSZ, meaning the resistance is less temperature sensitive and the performance enhancement is greater at lower temperatures. Accordingly, the cells of the present disclosure have a higher operating voltage and thus a higher power output for any given current compared to the prior art. Some variation in pH of the precursor solution was found occasionally to affect the quality of the deposited films, and it was found that reducing the pH of the solution to under pH 6 by the addition of acids mitigated this issue.

Example 2—Preparation of Crystalline Ytterbium Doped Zirconia Layer

A solution was made by dissolving zirconium acetylacetonate and ytterbium(III) nitrate pentahydrate in a solvent mixture of 90 vol % ethanol and 10 vol % methoxypropanol to give a total molarity of metal ions of 0.08M, with the ratio of zirconium to ytterbium of 0.802:0.198. This gives a desired 11 mol % ytterbia in the finished material (crystalline ytterbium doped zirconia). The salts were dissolved at 50° C. and then the solution was allowed to cool to room temperature.

The solution was deposited onto a half cell of a solid oxide fuel cell of the kind described in WO 2016/124928 (paragraph [0052], FIG. 3 of that document) consisting of a ferritic stainless steel support and a layer of dense sintered CGO (cerium gadolinium oxide) electrolyte applied thereto. The purpose of the deposition was to understand the conductivity impact of increasing the ytterbia dopant concentration from 8 mol % to 11 mol %.

The deposition was undertaken using a jetting head on an automated X-Y stage. The liquid was deposited as discrete droplets of fixed volume, with the frequency of deposition and speed of the X-Y stage being tuned such that the liquid droplets covered the whole surface of the part without overlapping. The droplets spread out and merge together on the part after deposition to form a uniform liquid film. The total volume of liquid deposited was calibrated such that the final film would be approximately 80 nm thick.

The resulting liquid film was allowed to dry in still air for 4 minutes, which was long enough for the solvents to evaporate leaving a uniform transparent film of precursor salts.

The part coated in a dried film of the ytterbium and zirconium precursor salts was placed on an infrared heater lamp and heated over a 3 minute cycle such that the temperature of the part reached a temperature in the range 400° C. to 600° C. in order to decompose the precursor salts to an amorphous oxide film, before being allowed to cool back to close to room temperature. These deposition, drying and heating steps were repeated a further five times to build up a layer thickness of approximately 500 nm by means of six passes.

The whole half cell was then placed in a furnace and heated from room temperature to 800° C. in air, increasing the temperature at a rate of 5° C. per minute, with a dwell of one hour, in order to crystallize the amorphous oxide film to a nanocrystalline film of 11YbSZ as desired.

The whole process (i.e. deposition, drying, heating and firing) described above was repeated one further time to produce a layer of 11 YbSZ with a total thickness of approximately 1 μm (i.e. formed by twelve deposition steps in total).

A layer of doped ceria was then deposited onto the layer of 11YbSZ in the same manner as described in WO 2009/090419 (page 26, line 10 to 17 of that document).

An air electrode was screen printed onto the finished three-layer electrolyte consisting of perovskite oxides as known in the art.

Several additional cells were made using the same process, and built into a solid oxide fuel cell stack. The electrochemical performance of this stack was compared to the system of WO 2009/090419 which uses a 10Sc1YSZ interlayer.

The internal resistance of the cells was measured as a function of temperature using AC impedance spectroscopy. This allows the internal resistance of the cell to be split into its component parts. The ohmic (series) resistance of the cell includes the resistance to transport of oxygen ions through the zirconia layer. The ohmic resistance of the cells is exponentially temperature dependent, and plotting the natural log of ohmic resistance against reciprocal temperature produces a straight line (known as an Arrhenius plot).

As shown in FIG. 2 is the ohmic resistance as a function of temperature of 11YbSZ interlayers also made by the method disclosed in this disclosure. It can be seen that the performance of 11YbSZ is intermediate between 8YbSZ and 10Sc1YSZ, both in terms of absolute resistance and the activation energy for temperature dependence.

Example 3—Preparation of Crystalline Ytterbium Doped Zirconia Layer

A crystalline 8YbSZ zirconia layer was deposited using substantially the same method as described in Example 1, however the solution used was acidified to allow the solution concentration to be increased to 0.16M as described below.

A solution was made by dissolving zirconium acetylacetonate and ytterbium(III) nitrate pentahydrate in a solvent mixture of 89.5 vol % ethanol, 10 vol % methoxypropanol and 0.5 vol % glacial acetic acid to give a total molarity of metal ions of 0.16M, with the ratio of zirconium to ytterbium of 0.852:0.148. This gives a desired 8 mol % ytterbia in the finished material (crystalline ytterbium doped zirconia). The salts were dissolved at 50° C. and then the solution was allowed to cool to room temperature. The addition of the acid further enhances the solubility of the zirconium salt in the solution. The pH of the solution was reduced to 4-5.

The solution was then deposited substantially as described in example 1, but to compensate for the higher solution molarity the volume of liquid deposited on the part per pass was reduced slightly by reducing the time the solenoid valve on the jetting head was open for each droplet. This ensured the mass of YbSZ deposited per pass remained similar and the total desired layer thickness could be achieved in 6 deposition steps.

Example 4—Preparation of Crystalline Ytterbium Doped Zirconia Layer

A crystalline 8YbSZ zirconia layer was deposited using substantially the same method as described in Example 1, however ethyl acetate was used as the primary solvent instead of ethanol, allowing the solution concentration to be increased to 0.16M without crystallization.

A solution was made by dissolving zirconium acetylacetonate and ytterbium(III) nitrate pentahydrate in a solvent mixture of 90 vol % ethyl acetate and 10 vol % methoxypropanol to give a total molarity of metal ions of 0.16M, with the ratio of zirconium to ytterbium of 0.852:0.148. This gives a desired 8 mol % ytterbia in the finished material (crystalline ytterbium doped zirconia). The salts were dissolved at 50° C. and then the solution was allowed to cool to room temperature. The addition of the ethyl acetate further enhances the solubility of the zirconium salt in the solution.

The solution was then deposited substantially as described in example 1, but to compensate for the higher solution molarity the volume of liquid deposited on the part per pass was reduced slightly by reducing the time the solenoid valve on the jetting head was open for each droplet. This ensured the mass of YbSZ deposited per pass remained similar and the total desired layer thickness could be achieved in 6 deposition steps.

Example 5—Preparation of Crystalline Ytterbium Doped Zirconia Layer

A crystalline 8YbSZ zirconia layer was deposited using substantially the same method as described in Example 1, however a small amount of concentrated nitric acid was added to the solution, allowing the solution concentration to be increased to 0.16M without crystallization.

A solution was made by dissolving zirconium acetylacetonate and ytterbium(III) nitrate pentahydrate in a solvent mixture of 90 vol % ethanol and 10 vol % methoxypropanol to give a total molarity of metal ions of 0.16M, with the ratio of zirconium to ytterbium of 0.852:0.148. This gives a desired 8 mol % ytterbia in the finished material (crystalline ytterbium doped zirconia). Using a pH probe and under vigorous stirring concentrated nitric acid was added dropwise until the pH of the solution was reduced to 3-4. The salts were dissolved at 50° C. and then the solution was allowed to cool to room temperature.

The solution was then deposited substantially as described in example 1, but to compensate for the higher solution molarity the volume of liquid deposited on the part per pass was reduced slightly by reducing the time the solenoid valve on the jetting head was open for each droplet. This ensured the mass of YbSZ deposited per pass remained similar and the total desired layer thickness could be achieved in 6 deposition steps.

Example 6—Deposition Solution Concentrations

Solutions for interlayer deposition have been formulated using the same method described above in Example 1. Several solutions were prepared with a range of metal ion molarities. The concentration of these solutions varied from 0.08M to 0.16M. Zirconium acetylacetonate was used with ytterbium(III) nitrate pentahydrate used as the dopant salt in a solvent mixture of 90 vol % ethanol and 10 vol % methoxypropanol, with the intention of giving a final oxide composition of 8YbSZ $(ZrO_2)_{0.92}(Yb_2O_3)_{0.08}$. The stability of the solutions was investigated and is summarized in table 1 below.

TABLE 1 stability of deposition solutions

| Metal Ion Concentration | Stability |
| --- | --- |
| 0.08M | Fully stable for 4+ weeks. |
| 0.12M | Fully stable for 4+ weeks. |

TABLE 1-continued stability of deposition solutions

| Metal Ion Concentration | Stability |
|---|---|
| 0.14M | Stable for 3 weeks, some fine needle-like crystals formed which readily redissolved on stirring and heating. |
| 0.16M | Immediately unstable, salts dissolved upon heating but crystals formed within 12 h of cooling back to room temperature. |

By contrast solutions made according to Examples 3, 4 and 5, using acetic acid addition, or ethyl acetate as the primary solvent or nitric acid addition respectively were all stable for 4+ weeks at 0.16M.

In contrast, similar solutions using scandium salts as the dopant, intended to formulate a layer of 10Sc1YSZ (scandium yttrium stabilized zirconia) show a drop off in stability as the metal ion concentration is increased beyond 0.08 M. Acidification and/or use of ethyl acetate as a solvent do allow a higher concentration to be achieved, but the solubility limit is around 0.12M, still substantially below that achievable by the use of ytterbium.

Example 7—Analysis of 8YbSZ Interlayer

Figure 3:
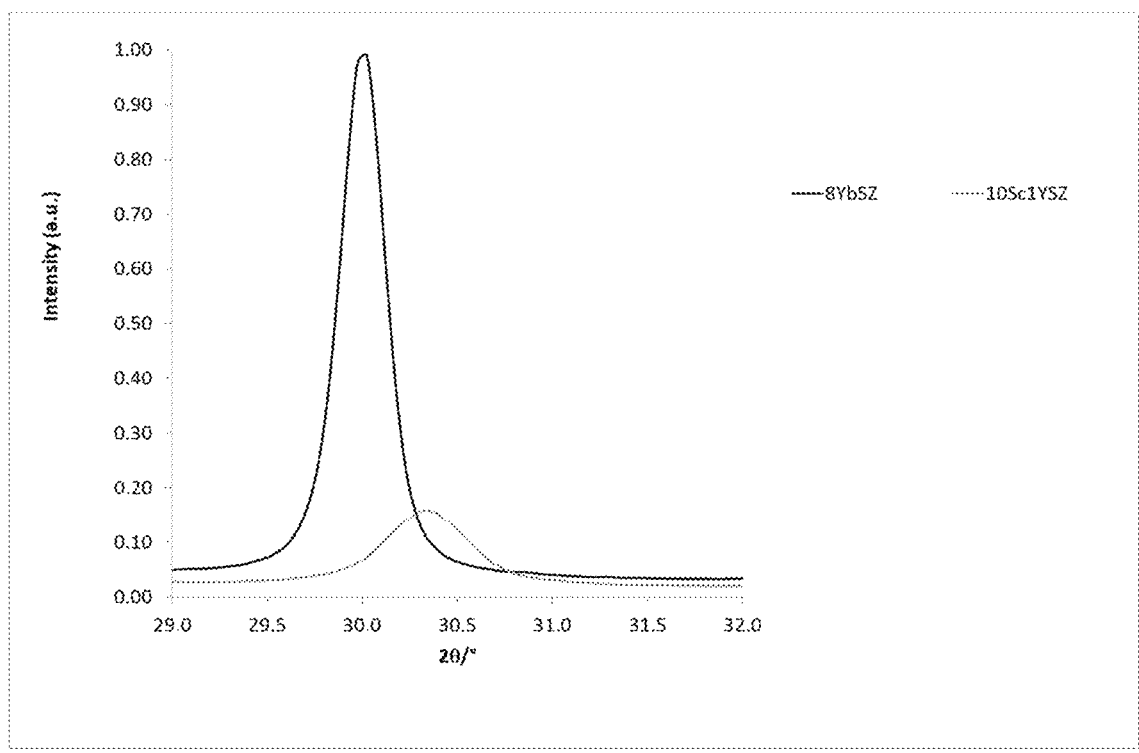
FIG. 3 shows XRD data of layers comprising 8YbSZ of the present disclosure and those comprising 10Sc1YSZ.

FIG. 3 shows the primary (111) cubic fluorite crystal plane peaks taken from X-ray diffraction (XRD) measurements using Cu Kα radiation of an 8YbSZ film made according to this method and finally fired at 890° C., and the equivalent prior-art 10Sc1YSZ film. The 8YbSZ film shows a higher level of crystallinity evidenced from the higher and narrower peak. The peak positions are also slightly shifted relative to each other which is consistent with expected changes in the cubic crystal lattice parameter between the two materials, with 8YbSZ having a slightly more open lattice due to $Yb^{3+}$ ions being slightly larger than $Sc^{3+}$ ions. The higher crystallinity of the 8YbSZ material implies the crystals in the film are larger, which is potentially beneficial for electrochemical performance as it means there are likely to be fewer grain boundaries adding to the resistance to oxygen ion transport. This in turn results in enhanced cell power output, particularly at lower temperatures (<550° C.).

Example 8—Analysis of 8YbSZ Interlayer Thickness

Figure 4:
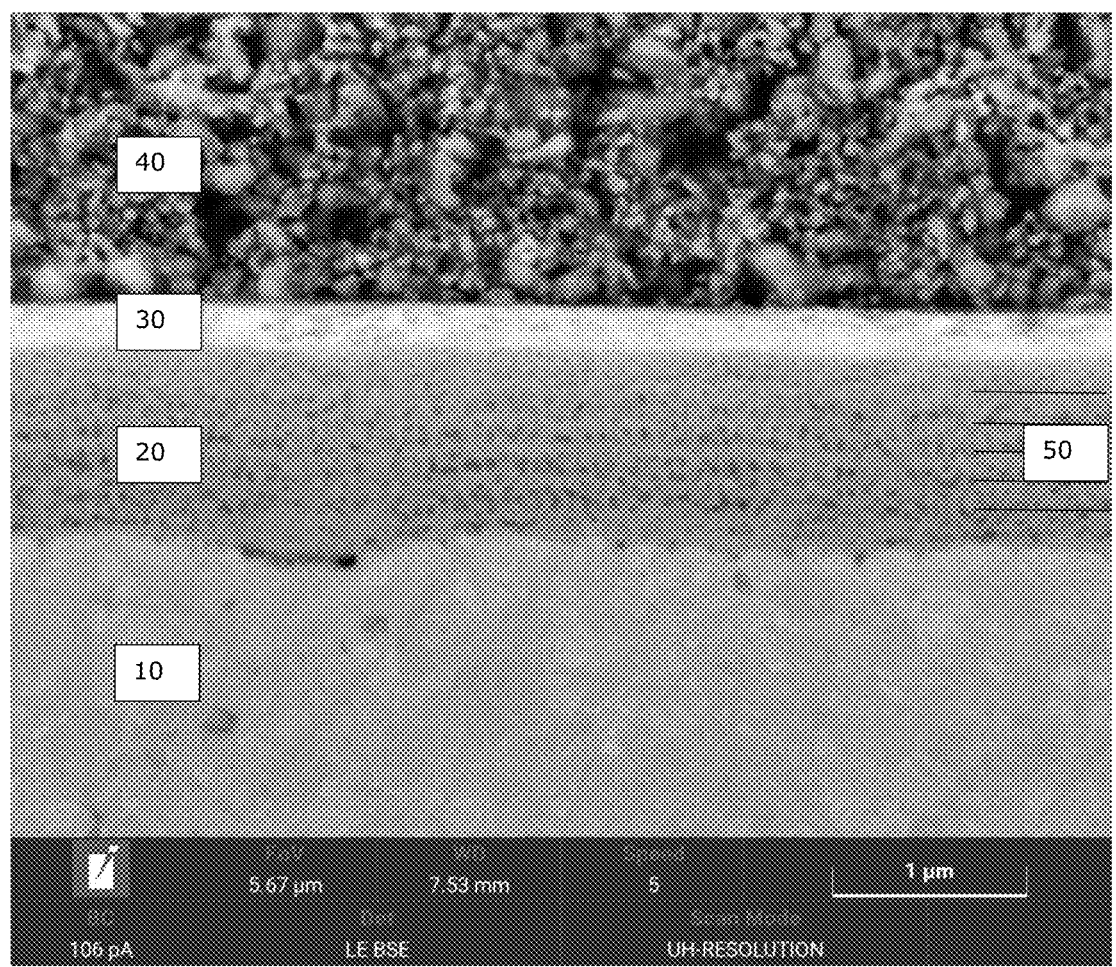
FIG. 4 shows a comparison of achievable thickness between layers comprising 8YbSZ of the present disclosure and those comprising 10Sc1YSZ.

FIG. 4 shows a high-resolution SEM image of a cross-section of an 8YbSZ interlayer on a metal-supported SOC deposited as described in Example 1. The 8YbSZ interlayer (20) was deposited on top of a dense sintered CGO electrolyte (10) in a total of 6 passes. Also visible are a thin doped ceria cathode interfacial layer (30) and an air electrode (40) required to make a functioning SOC cell. The interfaces between layers, indicated by lines (50) are visible in areas of the image, which show the 6 films required to achieve a total interlayer thickness of approximately 1 μm, indicated by the scale-bar on the bottom of the image. By contrast the prior-art process requires 12 films to achieve the same thickness.

Example 9—Effect of Level of Dopant % Yb on Solution Solubility

The zirconium cation is the limiting factor in the solubility of an interlayer precursor solution and hence, as the level of z, i.e. the dopant % of Yb cation is reduced, the amount of Zirconium cation commensurately increases. Thus, a 0.14M solution as described in Example 1 with 12 mol % Yb dopant level dissolved well to give a solution, whereas a lower dopant level of 6 mol % Yb dopant level of the same molarity had lower overall solubility causing some recrystallization.

The invention claimed is:

1. A method of manufacturing a layer of crystalline ytterbium doped zirconia on a substrate, wherein the method comprises the steps of:
    (i) depositing a solution comprising precursor metal salts of the ytterbium doped zirconia onto a surface of the substrate, wherein the surface is a metallic or a ceramic surface;
    (ii) drying the solution to form a film of the precursor metal salts on the surface;
    (iii) heating the film of the precursor metal salts to decompose it to form an ytterbium doped zirconia; and
    (iv) firing said film(s) to form the layer of crystalline ytterbium doped zirconia;
    wherein a pH of the solution is 2 to 6.

2. The method according to claim 1, wherein the substrate comprises a dense solid oxide electrolyte for a solid oxide cell, and the layer of crystalline ytterbium doped zirconia is formed on the substrate.

3. The method according to claim 1, wherein the layer comprises a crystalline ytterbium doped zirconia with a cubic crystal structure.

4. The method according to claim 1, wherein the substrate in step (i) has a temperature of 10° C. to 100° C.

5. The method according to claim 1, wherein a temperature of step (iii) is 200° C. to 600° C.

6. The method according to claim 1, wherein the precursor metal salts comprise a zirconium salt and a ytterbium salt, wherein the zirconium salt is zirconium acetylacetonate.

7. The method according to claim 1, wherein the precursor metal salts comprise a zirconium salt and a ytterbium salt, wherein the ytterbium salt comprises one or more of: ytterbium nitrate, ytterbium acetate tetrahydrate, and ytterbium acetylacetonate.

8. The method according to claim 1, wherein a concentration of metal ions in the solution is 0.05M to 0.2M.

9. The method according to claim 1, wherein the solution comprises a solvent comprising one or more of: methanol, ethanol, propanol, methoxypropanol, ethylacetate, acetone, and butyl carbitol.

10. The method according to claim 1, wherein the solution further comprises an acid comprising one or more of: acetic acid, citric acid, and nitric acid.

11. The method according to claim 1, wherein step (i) involves depositing the solution via spraying, jetting, dipping, or spin coating the solution onto the substrate.

12. The method according to claim 1, wherein a temperature in step (iv) is 500° C. to 1100° C.

13. The method according to claim 1, wherein step (iii) further comprises cooling the layer to a temperature of less than 150° C.

14. The method according to claim 1, wherein the ytterbium doped zirconia has a formula:

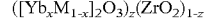

wherein M is a metallic dopant ion;
z is 0.03 to 0.13; and
x is 0.05 to 1.

15. The method according to claim 14, wherein x is 1.

16. The method according to claim 14, wherein z is 0.06 to 0.12.

17. A method according to claim 1, comprising an additional step in which steps (i) to (iv) are repeated at least once, whereby in the additional step the substrate comprises the layer of crystalline ytterbium doped zirconia produced in step (iv).

18. The method according to claim 1, wherein any or all of steps (ii), (iii), and (iv) is or are conducted in air.

19. The method of claim 1, further comprising repeating steps (i) to (iii) prior to firing the film(s).

* * * * *